United States Patent
Muhlestein et al.

(10) Patent No.: US 7,269,696 B2
(45) Date of Patent: Sep. 11, 2007

(54) METHOD AND APPARATUS FOR ENCAPSULATING A VIRTUAL FILER ON A FILER

(75) Inventors: Mark Muhlestein, Tuscon, AZ (US); Gaurav Banga, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 208 days.

(21) Appl. No.: 10/410,064

(22) Filed: Apr. 9, 2003

(65) Prior Publication Data
US 2003/0195942 A1    Oct. 16, 2003

Related U.S. Application Data

(63) Continuation of application No. 10/035,664, filed on Dec. 28, 2001.

(51) Int. Cl.
G06F 12/00    (2006.01)

(52) U.S. Cl. .................. 711/147; 711/148; 709/215

(58) Field of Classification Search ........ 709/212–219; 711/114, 147, 148
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,513,314 A * | 4/1996 | Kandasamy et al. | 714/6 |
| 5,754,829 A * | 5/1998 | Motohiro et al. | 709/201 |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |

(Continued)

OTHER PUBLICATIONS

"Design of a Virtual Server for Service Interworking over Heterogeneous Networks", Nam et al. Electron. & Telecommun. Res. Inst., Teajon, Soth Korea, Aug. 20-22, 1997. pp. 406-409.*

(Continued)

Primary Examiner—T Nguyen
(74) Attorney, Agent, or Firm—Cesari & McKenna, LLP

(57) ABSTRACT

An architecture provides the ability to create and maintain multiple instances of virtual servers, such as virtual filers (vfilers), within a server, such as a filer. A vfiler is a logical partitioning of network and storage resources of the filer platform to establish an instance of a multi-protocol server. Each vfiler is allocated a subset of dedicated units of storage resources, such as volumes or logical sub-volumes (qtrees), and one or more network address resources. Each vfiler is also allowed shared access to a file system resource of a storage operating system. To ensure controlled access to the allocated and shared resources, each vfiler is further assigned its own security domain for each access protocol. A vfiler boundary check is performed by the file system to verify that a current vfiler is allowed to access certain storage resources for a requested file stored on the filer platform.

35 Claims, 8 Drawing Sheets

500

| NAME 502 | UUID 504 | | | | | |
|---|---|---|---|---|---|---|
| VFILER LIST 506 | IPSPACE ID 508 | | | | | |
| VFSTORE LIST 510 | VFNET LIST 512 | | | | | |
| /ETC/ PASSWD, GROUP 516 | | | | | | |
| MULTI - PROTOCOL MAPPING LIBRARY 518 | | | | | | |
| CIFS 520 | NFS 530 | RSH 540 | TELNET 550 | NIS 560 | DNS 570 | REGISTRY 580 |
| DOMAIN CNTRL 522 | | | | | | |
| ACTIVE SESSIONS 524 | | | | | | |
| CONTROL BLOCKS 525 | | | | | | |
| SECURITY DOMAIN 526 | | | | | | |
| PID 528 | | | | | | |

U.S. PATENT DOCUMENTS

| | | | |
|---|---|---|---|
| 6,065,037 | A | 5/2000 | Hitz et al. |
| 6,230,200 | B1 * | 5/2001 | Forecast et al. ............ 709/226 |
| 6,425,035 | B2 | 7/2002 | Hoese et al. |
| 6,457,130 | B2 | 9/2002 | Hitz et al. |
| 6,802,062 | B1 * | 10/2004 | Oyamada et al. .............. 718/1 |
| 6,813,766 | B2 * | 11/2004 | Hay ............................... 718/1 |
| 6,854,114 | B1 * | 2/2005 | Sexton et al. ................... 718/1 |
| 6,865,601 | B1 * | 3/2005 | Cherkasova et al. ........ 709/220 |
| 6,944,699 | B1 * | 9/2005 | Bugnion et al. ............ 710/269 |
| 2001/0011304 | A1 * | 8/2001 | Wesinger et al. ........... 709/227 |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

U.S. Appl. No. 10/035,666, Banga et al.

* cited by examiner

| NAME 502 | UUID 504 | | | | | |
|---|---|---|---|---|---|---|
| VFILER LIST 506 | IPSPACE ID 508 | | | | | |
| VFSTORE LIST 510 | VFNET LIST 512 | | | | | |
| /ETC/PASSWD, GROUP 516 | | | | | | |
| MULTI-PROTOCOL MAPPING LIBRARY 518 | | | | | | |
| CIFS 520 | NFS 530 | RSH 540 | TELNET 550 | NIS 560 | DNS 570 | REGISTRY 580 |
| DOMAIN CNTRL 522 | | | | | | |
| ACTIVE SESSIONS 524 | | | | | | |
| CONTROL BLOCKS 525 | | | | | | |
| SECURITY DOMAIN 526 | | | | | | |
| PID 528 | | | | | | |

METHOD AND APPARATUS FOR ENCAPSULATING A VIRTUAL FILER ON A FILER

RELATED APPLICATION

This application is a continuation of U.S. patent application Ser. No. 10/035,664 Dec. 28 2001, entitled ARCHITECTURE FOR CREATING AND MAINTAINING VIRTUAL FILERS ON A FILER, by Mark M. Muhlestein, et al.

FIELD OF THE INVENTION

The present invention relates to server architectures and, more specifically, to an architecture that enables instantiation of multiple logical servers within a single physical server platform.

BACKGROUND OF THE INVENTION

A file server is a computer that provides file service relating to the organization of information on writeable persistent storage devices, such memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A storage system may be further configured to operate according to a client/server model of information delivery to thereby allow many clients to access an application service executed by a server, such as a file server. In this model, the client may comprise an application executing on a computer that "connects" to the file server over a computer network, such as a point-to-point link, shared local area network, wide area network or virtual private network implemented over a public network, such as the Internet. Each client may request the services of the file system on the file server by issuing file system protocol messages (in the form of packets) to the server over the network. It should be noted, however, that the file server may alternatively be configured to operate as an assembly of storage devices that is directly-attached to a (e.g., client or "host") computer. Here, a user may request the services of the file system to access (i.e., read and/or write) data from/to the storage devices.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage devices (disks), defining an overall logical arrangement of disk space. Each volume is generally associated with its own file system. In the WAFL file system, a special directory, called a "qtree", may be created that has the properties of a logical sub-volume within the namespace of a physical volume. Each file system object (file or directory) is associated with one and only one qtree, and quotas, security properties and other items can be assigned on a per-qtree basis. Each volume has its own file system identifier (ID) and each qtree within a volume has its own qtree ID.

A filer typically includes a large amount of storage (e.g., 6 terabytes) with the ability to support many (thousands) of users. This type of storage system is generally too large and expensive for many applications or "purposes". Even a typical minimum storage size of a volume (or file system) is approximately 150 gigabytes (GB), which is still generally too large for most purposes.

Rather than utilizing a single filer, a user may purchase a plurality of smaller servers, wherein each server is directed to accommodating a particular purpose of the user. However, there is still the granularity of storage issue since, as noted, the typical minimum storage size of a volume is approximately 150 GB. In addition, the acquisition of many smaller servers may be more costly than the purchase of a single filer. Furthermore, the cost of maintenance and administration of many smaller servers is typically substantially more than the cost of maintaining and administering a single filer. Therefore, it would be desirable to consolidate many servers within a single filer platform in a manner that logically embodies those servers. Server consolidation is thus defined as the ability to provide multiple logical or virtual servers within a single physical server platform. Examples of virtual servers that may be embodied within a single platform are web servers, database servers, mail servers and name servers.

Prior server consolidation solutions provide many independent servers that are essentially "racked together" within a single platform. An example of this solution is the Celerra™ architecture available from EMC® Corporation. The Celerra architecture utilizes the notion of a data mover or an instance of a file server that "front ends" a Symmetrix® storage device having storage resources that can be logically apportioned and assigned to various other data movers. Each data mover has its own set of networking hardware and its own processor running its own copy of the operating system.

Other server consolidation solutions are configured to run multiple instances of a server on a single physical platform. For example, the virtual machine (VM) operating system from IBM® Corporation executes on a mainframe computer system and enables execution of multiple instances of servers on that computer system. Each VM is a complete instantiation of an entire operating system having its own file system and storage resources. That is, there is no sharing of file system and storage resources among the VMs operating on the mainframe. Rather, the storage resources of the computer system are apportioned and dedicated to instances of VMs embodied on the computer.

Another example of a server consolidation solution adapted to run multiple instances of a server process is Samba. Samba is an open-source Windows-compatible server running on a UNIX operating system platform. The Samba server is implemented at the application layer of the system to provide multiple instances of Windows-compatible servers running on the UNIX platform. Samba is an example of a more general "server process replication" based approach for implementing multiple servers on a single physical platform.

Finally, the simplest method of implementing server consolidation is to rename all service (i.e., storage for file servers) units being consolidated such that they are unique among themselves and to configure one instance of the consolidated server that serves all of the service (storage) units. This technique is hereinafter referred to as "server bundling".

Process-based and server bundling-based server consolidation solutions typically do not provide different security characteristics for each of the server instances running on the platform. For example, Samba has only one set of security characteristics (i.e., a security domain) pertaining to non-replicated parts of its platform infrastructure for all of its instances of Windows-compatible (e.g., NT) servers. An example of a security dos main is the Windows NT™ domain security. The NT domain security is an abstraction whereby all users and servers of a domain share the same security information, which may include authorized user and group identifiers ("security objects") and resources of an operating system.

Broadly stated, the security information is maintained in a security account manager (SAM) database by a Windows NT protected subsystem. The SAM database is equivalent to a combination of /etc/passwd and /etc/group databases on a UNIX® server in that it contains only users and groups local to that server. The notation /etc/passwd, /etc/group denotes a configuration directory indicating a path to a password file and a group file used on the UNIX platform. A user with an account in a particular security domain can log onto and access his or her account from any server in the domain. Typically, one server can be in one security domain (for each access protocol) at a time. Multi-protocol servers can be in as many as one security domain for each access protocol. For example, a multi-protocol filer may be in an NT4 domain for Common Internet File System (CIFS) access and in a Network Information System (NIS) domain for Network File System (NFS) access. As mentioned above, UNIX environments also have security objects that may be different for different servers.

An aspect of Windows™ networking is the notion of a uniform naming convention (UNC) path that defines a way for a user to refer to a unit of storage on a server. A UNC path is prefixed with the string \\ to indicate resource names on a network. For example, a UNC path may comprise a server name, a share name and a path descriptor that collectively reference a unit of storage, such as a share. A share is a shared storage resource, such as a directory on a file system.

In an environment having multiple independent servers used to accommodate multiple security domains, all shares (and share names) must be distinct. However, if those servers are consolidated onto a single platform (by way of server process replication, such as Samba, or server bundling) using alias names for the server, the server names of the UNC paths to the shares may require change, since all share resources would be visible when accessed via any of the alias server names. In other words, although each server may have its own set of shares, users may have to change the UNC path definitions of those shares in order to access their data.

For example, assume that three (3) NT servers are organized such that a first NT server (NT1) and its clients are associated with security domain 1, while second and third NT servers (NT2, NT3) and their clients are associated with security domain 2. Thus, the clients (users) of NT2 and NT3 share the same security database within security domain 2. If a user of domain 2 refers to a particular share (proj1) on NT3, it first attaches to security domain 2 in order to authenticate and then attaches to the server and share on that server. An illustrative example of the notation of the UNC path specified by the user is:

\\NT3\data\proj1

Assume now that the servers NT1-3 and their attached resources are consolidated onto one server platform. This raises the issue as to how the clients of a particular domain refer to their data. That is, if each client has a share called proj1 and all of the shares are consolidated within a single platform, there must be a way to differentiate those shares. Migration and reconfiguration of data on storage resources of a server is typically not transparent to a client system; in fact, this issue is often resolved by requiring the client system to change its path descriptor to its data. Such an approach is generally undesirable because it requires action on behalf of the client system. Moreover, if the storage resources are consolidated on one or more servers, it is possible that those servers may not be in the same security domain as the users accessing those resources.

The VM and data mover server consolidation techniques, which are based on partitioning of physical system resources and replication of operating system objects, do not suffer from the two above-mentioned limitations of not being able to consolidate servers from multiple security domains or requiring service (storage) unit renaming. However, these techniques do have other limitations. The operating systems of such server consolidation solutions typically contain software objects that are representative of physical hardware devices, such as network interface cards or well-defined collections of hardware devices. An example of a software object representative of a collection of hardware devices is a file system that allocates space on a set of storage disks available for use by applications running on the operating system.

In a VM or data mover type of system, a static assignment of these hardware representative software objects is typically performed to associate a subset of the hardware resources of the system with a single instance of a VM/data mover (virtual server). The assignment of resources to each virtual server results in hardware resources being directly associated with the specific virtual server, because the software objects that represent these hardware resources are directly assigned to the virtual servers. This direct assignment approach restricts resource management flexibility, particularly with respect to "logical" reassignment of resources among the virtual servers. This also hinders evolutionary growth of the server consolidation implementation because all partitioning and sizing decisions must be made at the time of consolidation and cannot be easily changed later as the consolidated servers evolve.

Server consolidation is particularly useful in the case of a storage server provider (SSP). An SSP serves ("hosts") data storage applications for multiple users or clients within a single, physical platform or "data center". The data center is centrally maintained by the SSP to provide safe, reliable storage service to the clients. In a typical configuration, the data center may be coupled to a plurality of different client environments, each having an independent private internal network ("intranet"). Each intranet may be associated with a different client or division of a client and, thus, the data traffic must be separately maintained within the physical platform.

Therefore, the present invention is directed to an architecture that enables instantiation of multiple, secure virtual servers within a single physical filer platform that allows flexible partitioning of physical resources.

The present invention is also directed to an architecture that enables instantiation of multiple, secure virtual servers within a single physical filer platform that is suitable for use in an SSP environment and that provides a high level of security for users.

The present invention is further directed to an architecture that enables encapsulation of a server, including its data and all its configuration information, stored in a form that allows efficient migration and re-instantiation of the server on a different physical platform for use in disaster recovery, data migration or load-balancing.

SUMMARY OF THE INVENTION

The present invention relates to an architecture that provides the ability to create and maintain, with substantial flexibility and fine granularity, multiple instances of virtual servers, such as virtual filers (vfilers), within a server, such as a filer platform. A vfiler is a logical partitioning of network and storage resources of the filer to establish an instance of a multi-protocol server. Each vfiler is maintained and executed independent of other vfilers on the platform. Dedicated filer resources, such as units of storage and network addresses of network interfaces, may be grouped and partitioned to establish security domains within the filer. Yet common filer resources, such as a storage operating system and a file system, may be shared among the vfilers.

Specifically, each vfiler is allocated dedicated and distinct units of storage resources, such as volumes or qtrees, and network addresses, such as Internet protocol addresses. Each vfiler is also allowed shared access to the common file system on behalf of its client system. Therefore, interpretations of a security object associated with, e.g., a client accessing the common file system may vary among vfilers. To address this, each vfiler is provided a vfiler context data structure including, among other things, information pertaining to a unique and distinct security domain of the vfiler (for each supported access protocol) to thereby enable controlled access to allocated and shared resources of the vfiler.

According to an aspect of the present invention, a vfiler boundary check is performed by the file system of the storage operating system to verify that a current vfiler executing on the filer is allowed to access certain storage resources for a requested file stored on the platform. The vfiler boundary check is based on configuration information, such as the unit of storage (qtree or volume) associated with the file, acquired from an inode of the requested file. Specifically, a file system identifier and qtree identifier are validated in accordance with a multi-stage verification procedure to ensure that they are members of the storage resources allocated to the current vfiler. For every request to access a unit of storage, the boundary check is performed using these identifiers to determine whether the requesting vfiler is authorized to access the storage resource. If the check reveals that the vfiler is not authorized to access the requested storage resource, the request is immediately denied. Otherwise, the request is allowed and the file system generates operations to process the request.

Advantageously, the novel vfiler architecture facilitates both consolidation of virtual servers and their respective data applications on a single filer, as well as encapsulation of all server network and storage resources. Server consolidation is achieved through the creation of vfilers, each of which is associated with a security domain (one for each supported access protocol). The security domains are completely disjoint, thereby providing separate and independent vfilers within the same filer platform. This aspect of the invention is particularly useful in the case of a storage service provider, wherein the data applications of multiple client organizations are hosted on the filer. Each client organization can access only its own vfiler and is entirely unaware that it is sharing the same physical filer with other organizations. The novel architecture thus obviates the need to dedicate a filer for each client organization.

Moreover, migration of storage resources between and among vfilers is transparent to clients since the storage resources are allocated on a per-vfiler basis. This obviates the need for a client to change the way (e.g., path descriptor) it refers to its data. Additionally, since the underlying file system is shared, the assignment of storage units to vfilers can be managed flexibly and with fine granularity. That is, a single volume can be shared by multiple vfilers; furthermore, a single filer can own one or more volumes and/or one or more qtrees on any of several volumes.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 5 is a schematic block diagram illustrating a vfiler context data structure in accordance with the present invention;

DETAILED DESCRIPTION OF AN ILLUSTRATIVE EMBODIMENT

Figure 1:
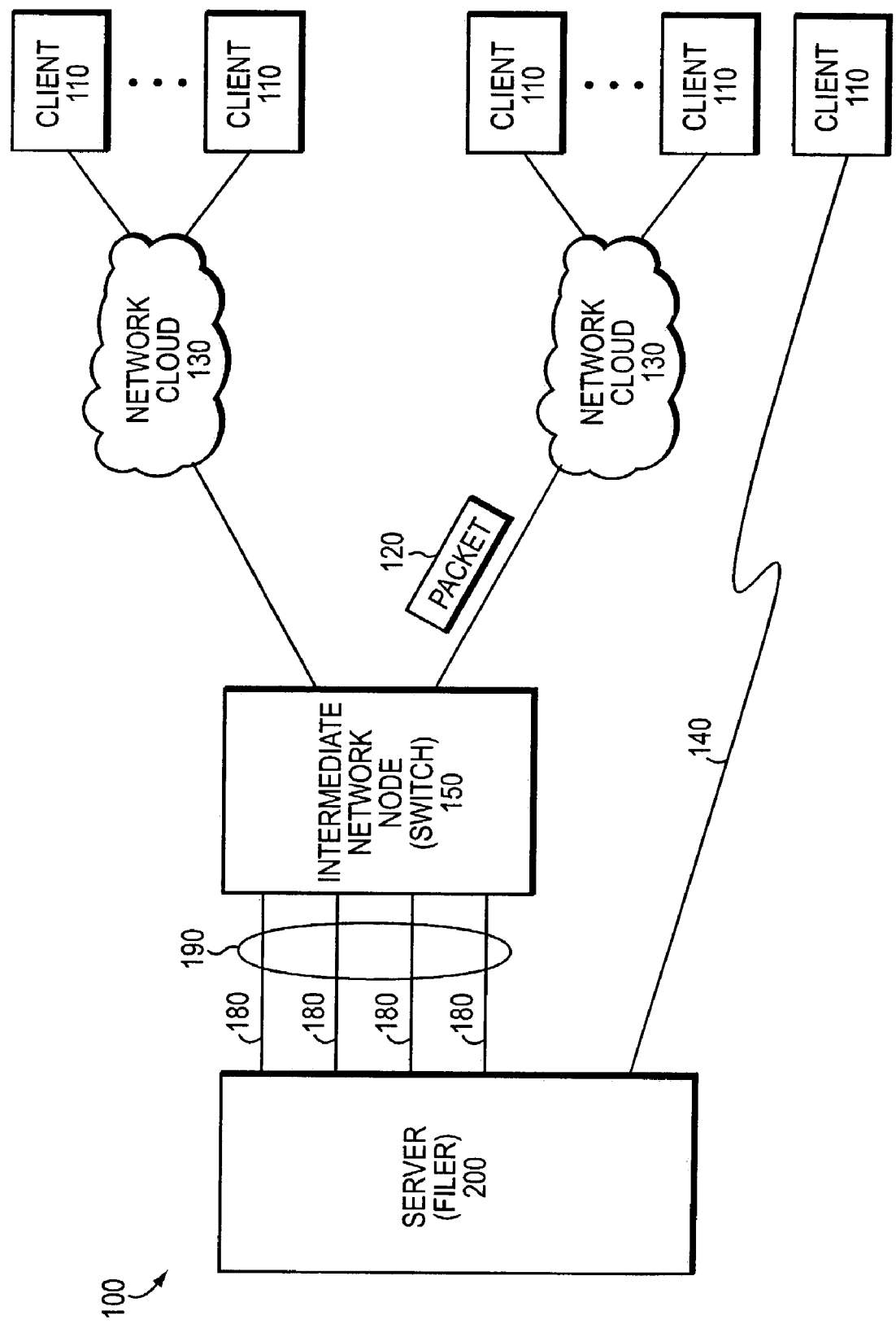
FIG. 1 is a schematic block diagram of a computer network including a plurality of clients and a server that may be advantageously used with the present invention.

FIG. 1 is a schematic block diagram of a computer network 100 including a plurality of clients 110 and a file server, such as a network storage appliance, that may be advantageously used with the present invention. The file server or filer 200 is a computer that provides file service relating to the organization of information on storage devices, such as disks. The clients 110 may be general-purpose computers configured to execute applications including file system protocols, such as the conventional Common Internet File System (CIFS) and Network File System (NFS) protocols. Moreover, the clients 110 may interact with the filer 200 in accordance with a client/server model of information delivery. That is, each client may request the services of the filer, and the filer may return the results of the services requested by the client, by exchanging packets 120 encapsulating, e.g., the CIFS and NFS protocol formats over the network 100. It will be understood to those skilled in the art that the inventive technique described herein may apply to any server capable of providing a service to any client in accordance with various applications executing on the client communicating with server applications on a server.

The filer 200 may be coupled to an intermediate network node, such as a router or switch 150, over a plurality of physical links 180, each of which may comprise, e.g., a gigabit Ethernet link, a 100 base T Ethernet link, a 10 base T Ethernet link or any similar link. The switch 150 is further coupled to the clients 110 over network clouds 130 configured as, e.g., local area networks (LANs) or virtual LANs (VLANs). Alternatively, the filer may be connected directly to one or more clients over a communications link 140 comprising a point-to-point connection or a shared medium, such as a LAN.

Figure 2:
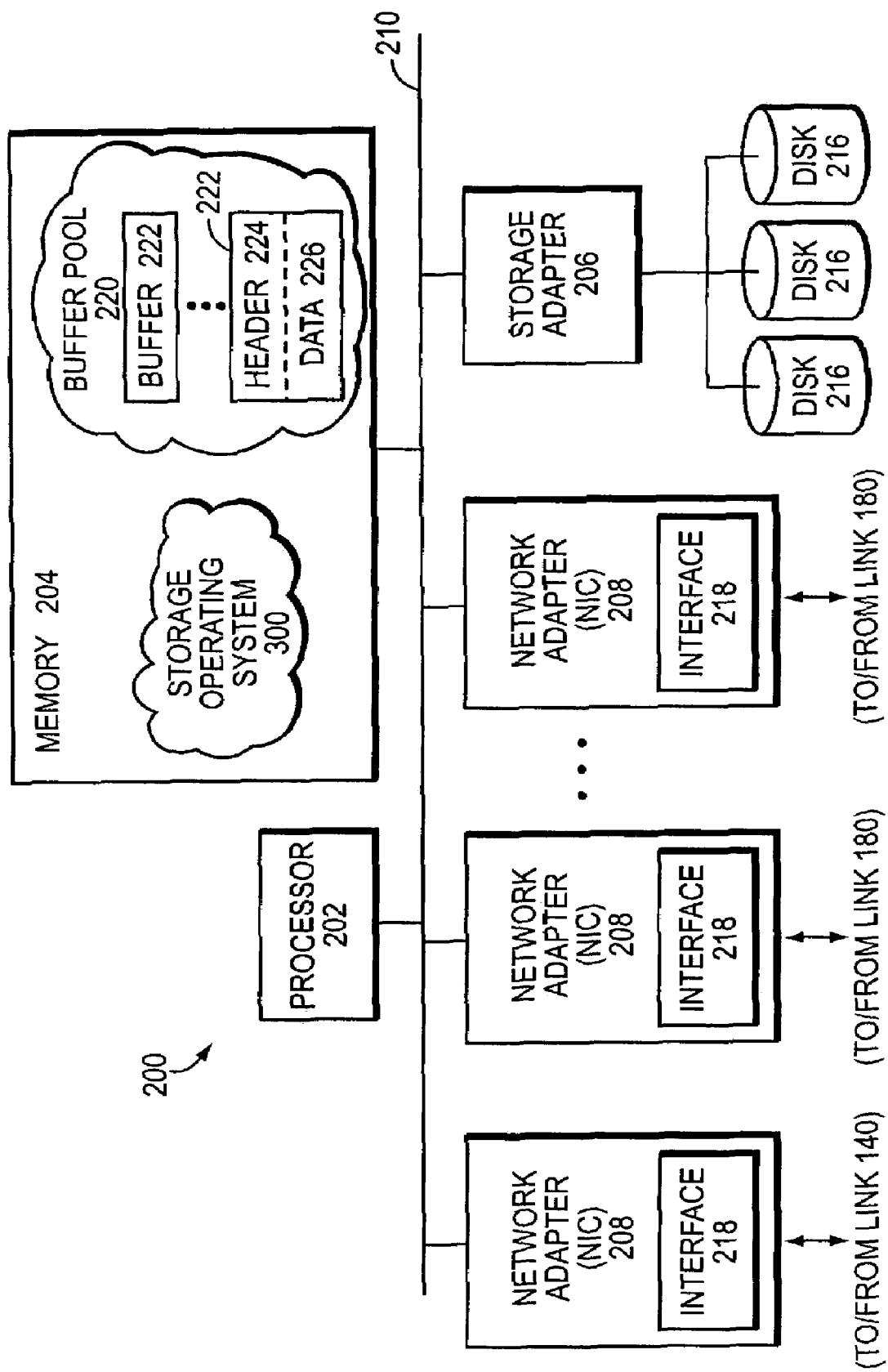
FIG. 2 is a schematic block diagram of a server, such as a network storage appliance or filer that may be advantageously used with the present invention.

FIG. 2 is a schematic block diagram of the filer 200 comprising a processor 202, a memory 204, a storage adapter 206 and one or more network adapters 208 interconnected by a system bus 210, e.g., a conventional peripheral computer interconnect (PCI) bus 210. The filer also includes a storage operating system 300 that implements a file system to logically organize the information as a hierarchical structure of directories and files on disks 216 coupled to the storage adapter 206. In the illustrative embodiment described herein, the operating system 300 is preferably the NetApp® Data ONTAP™ operating system available from Network Appliance, Inc. that implements a Write Anywhere File Layout (WAFL) file system.

The memory 204 may be apportioned into various sections, one of which is a buffer pool 220 organized as a plurality of data buffers 222 for use by network drivers of the operating system 300. Each network driver is assigned a list of buffers 222 that is used to load incoming data requests received at interfaces 218 of the network adapter 208, as described herein. Other sections of the memory may be organized as storage locations that are addressable by the processor and adapters for storing software program code and data structures associated with the present invention. The processor and adapters may, in turn, comprise processing elements and/or logic circuitry configured to execute the software code and access the data structures. The storage operating system 300, portions of which are typically resident in memory and executed by the processing elements, functionally organizes the filer by, inter alia, invoking storage and network operations in support of the services implemented by the filer 200. It will be apparent to those skilled in the art that other processing and memory means, including various computer readable media, may be used for storing and executing program instructions pertaining to the inventive technique described herein.

The network adapter 208 may comprise a network interface card (NIC) having the mechanical, electrical and signaling circuitry needed to connect the filer 200 to the switch 150 over the physical links 180. In one embodiment, the physical links and interfaces may be organized as an aggregate or virtual interface (VIF) 190. Each NIC may include a single interface 218 such that, for a 4-link VIF, the filer includes 4 NICs 208. Alternatively, each NIC 208 may include 4 "quad port" interfaces 218, each of which is connected to a link 180 of the VIF 190. In another embodiment, the physical links and interfaces may be arranged as a de-aggregate or VLAN. Each interface 218 may be assigned one or more Internet Protocol (IP) addresses along with one media access control (MAC) address. However, when the physical interfaces 218 and their associated links 180 are aggregated as a single virtual interface 190, all of the physical interfaces respond to only one MAC address. That is, the physical interfaces 218 are organized into one virtual "pipe" having one logical interface that is assigned a common MAC address.

The storage adapter 206 cooperates with the storage operating system 300 executing on the filer to access information requested by the client, which information may be stored on any storage media, such as the disks 216. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 202 (or the adapter 206 itself) prior to being forwarded over the system bus 210 to the network adapter 208, where the information is formatted into a packet 120 and returned to the client 110.

Storage of information on the filer is preferably implemented as one or more storage "volumes" that comprise a cluster of physical storage disks 216, defining an overall logical arrangement of disk space. Each volume is generally associated with its own file system. To facilitate access to the disks 216, the storage operating system 300 implements a file system that logically organizes the information as a hierarchical structure of directories and files on the disks. Each "on-disk" file may be implemented as set of disk blocks configured to store information, such as data, whereas the directory may be implemented as a specially formatted file in which information about other files and directories are stored. As noted, the storage operating system is preferably the Data ONTAP operating system that implements a WAFL file system. However, it is expressly contemplated that any appropriate file system can be used, and as such, where the term "WAFL" is employed, it should be taken broadly to refer to any file system that is otherwise adaptable to the teachings of this invention.

Figure 3:
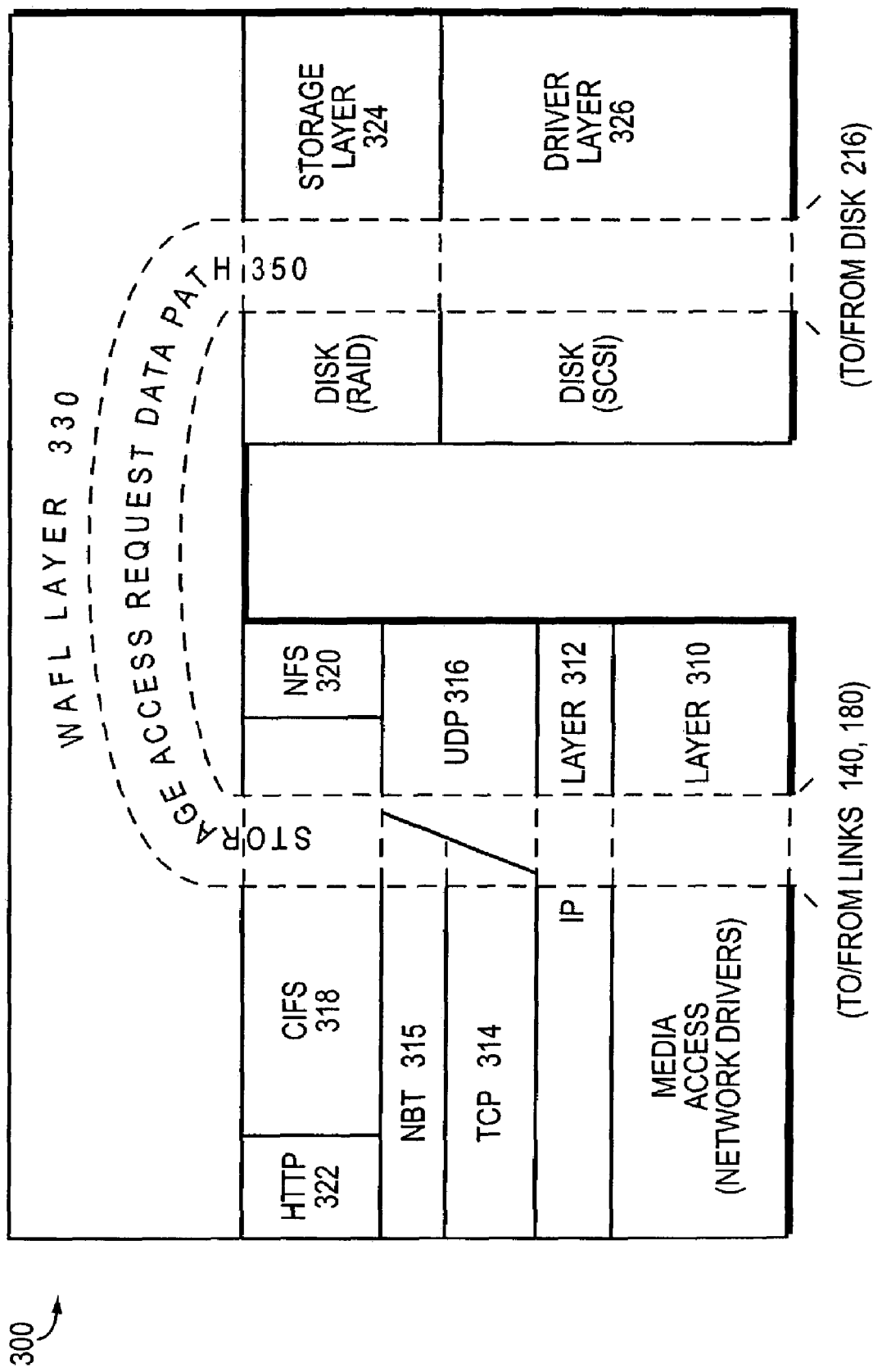
FIG. 3 is a schematic block diagram of a storage operating system that may be advantageously used with the present invention.

FIG. 3 is a schematic block diagram of the Data ONTAP operating system 300 that may be advantageously used with the present invention. The storage operating system comprises a series of software layers, including a media access layer 310 of network drivers (e.g., a gigabit Ethernet driver). The operating system further includes network protocol layers, such as the IP layer 312 and its supporting transport mechanisms, the Transport Control Protocol (TCP) layer 314 and the User Datagram Protocol (UDP) layer 316. A file system protocol layer provides multi-protocol data access and, to that end, includes support for the CIFS protocol 318, the NFS protocol 320 and the Hypertext Transfer Protocol (HTTP) protocol 322. The storage operating system 300 also includes a disk storage layer 324 that implements a disk storage protocol, such as a Redundant Array of Independent Disks (RAID) protocol, and a disk driver layer 326 that implements a disk access protocol such as, e.g., a Small Computer Systems Interface (SCSI) protocol.

Bridging the disk software layers with the network and file system protocol layers is a WAFL layer 330 that preferably implements the WAFL file system. The on-disk format representation of the WAFL file system is block-based using, e.g., 4 kilobyte (kB) blocks and using inodes to describe the files. An inode is a data structure, e.g., a 128-byte structure, which is used to store information, such as meta-data, about a file. The meta-data contained in an inode may include, e.g., ownership of the file, access permission for the file, size of the file, file type, unit of storage associated with the file and location of the file on disk. The WAFL file system uses a file handle, i.e., an identifier that includes an inode number, to retrieve an inode from disk. The WAFL layer 330 also uses files to store meta-data describing the layout of its file system. These meta-data files include, among others, an inode file.

Operationally, a request from a client 110 is forwarded as, e.g., a conventional CIFS or NFS protocol packet 120 over the computer network 100 and onto a network adapter 208 of the filer 200. A network driver of the media access layer 310 cooperates with the network adapter to load the request packet into a data buffer 222 and marks the buffer with the name of the physical interface 218 over which the incoming request was received at the filer. Each buffer 222 includes a header 224 and a data portion 226, with the incoming packet being loaded into the data portion. The contents of the header are maintained by the filer and include (i) the type of buffer, (ii) various flags and (iii) the incoming interface marked by the filer. After being loaded with the incoming packet, the buffer 222 is essentially "pushed up" the network protocol stack and delivered to an appropriate application which services the requests by, e.g. fetching data stored on disks of the filer.

Specifically, the network driver 310 passes the buffer to the network protocol layers 312-314 and onto the CIFS or NFS layer 318, 320 for additional processing prior to forwarding to the WAFL layer 330. The WAFL file system generates operations to load (retrieve) the requested data (and inode) from disk 216 if it is not resident "in core", i.e., in the memory 204. If the information is not in memory, the WAFL layer 330 indexes into the inode file using the inode number to access an appropriate entry and retrieve a logical volume block number (VBN). The WAFL layer then passes the logical VBN to the disk storage (RAID) layer 324, which maps that logical number to a disk block number and sends the latter to an appropriate driver (e.g., SCSI) of the disk driver layer 326. The disk driver accesses the disk block number from disk 216 and loads the requested data block(s) in memory 204 for processing by the filer. Upon servicing the request, the CIFS or NFS layer 318, 320 allocates another (response) buffer 222 from the buffer pool 220 for the fetched data and further associates that response to the initial request. That is, the CIFS or NFS layer marks the response buffer with the physical interface associated with the incoming request.

As noted, the filer 200 is configured to provide file service to a plurality of clients 110 and, as a result, generally returns data responsive to requests issued by the clients. In order to enhance its responsiveness, the filer implements a "fast path" technique that essentially returns a response over the same physical interface 218 that was used to receive a request from the client. To invoke the fast path technique, the CIFS or NFS layer 318, 320 asserts a fast path flag within the buffer header 224 and then passes the buffer "down" the protocol stack to the IP layer 312, which examines the state of that flag. Assertion of the fast path flag informs the IP layer that it does not have to perform route calculation for this particular response. Accordingly, the interface within the filer targeted to receive the response buffer is the incoming interface 218 over which the request was received. The buffer is forwarded to that interface and the requested data is then returned to the client 110 over the network 100.

It should be noted that the software "path" through the storage operating system layers described above needed to perform data storage access for the client request received at the filer may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation may increase the performance of the file service provided by filer 200 in response to a file system request packet 120 issued by client 110. Moreover, in another alternate embodiment of the invention, the processing elements of adapters 206, 208 may be configured to offload some or all of the packet processing and storage access operations, respectively, from processor 202, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. A server may be defined as a computer adapted to provide application service to one or more clients; in this context, a virtual server is an instance of the application service provided to a client. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Vfiler

The present invention comprises an architecture that provides the ability to create and maintain multiple instances of virtual servers, such as virtual filers (vfilers), within a single server, such as a filer. A vfiler is a logical partitioning of network and storage resources of the filer platform to establish an instance of a multi-protocol server. Each vfiler is maintained and executed entirely independent of other vfilers on the platform. To that end, dedicated filer resources, such as units of storage and network addresses of network interfaces, may be arbitrarily grouped and "hard" partitioned to establish security domains within the filer. Yet common filer resources, such as a storage operating system and a file system, may be shared among the vfilers.

Specifically, each vfiler is allocated a certain amount, i.e., a subset, of dedicated and distinct units of storage resources, and one or more dedicated and distinct network addresses. Each vfiler is also allowed shared access to the common file system on behalf of its client. Therefore, interpretations of a security object associated with, e.g., a client accessing the common file system may vary among vfilers. To address this, each vfiler is provided a vfiler context data structure (hereinafter "vfiler context") including, among other things, information pertaining to a unique and distinct security domain of the vfiler to thereby enable controlled access to allocated and shared resources of the vfiler.

For example, the vfiler context of a first vfiler ensures that users or clients of a first security domain can use a first set of source and destination network addresses when issuing requests to access a first subset of storage resources on the filer. Similarly, the vfiler context of a second vfiler ensures that clients of a second security domain may use a second set of source and destination network addresses to access a second subset of storage resources. Notably, the clients of each security domain are unaware of each other's "presence" on the filer and, further, are unable to access each other's storage resources. In sum, no data flow exists between vfilers.

Figure 4:
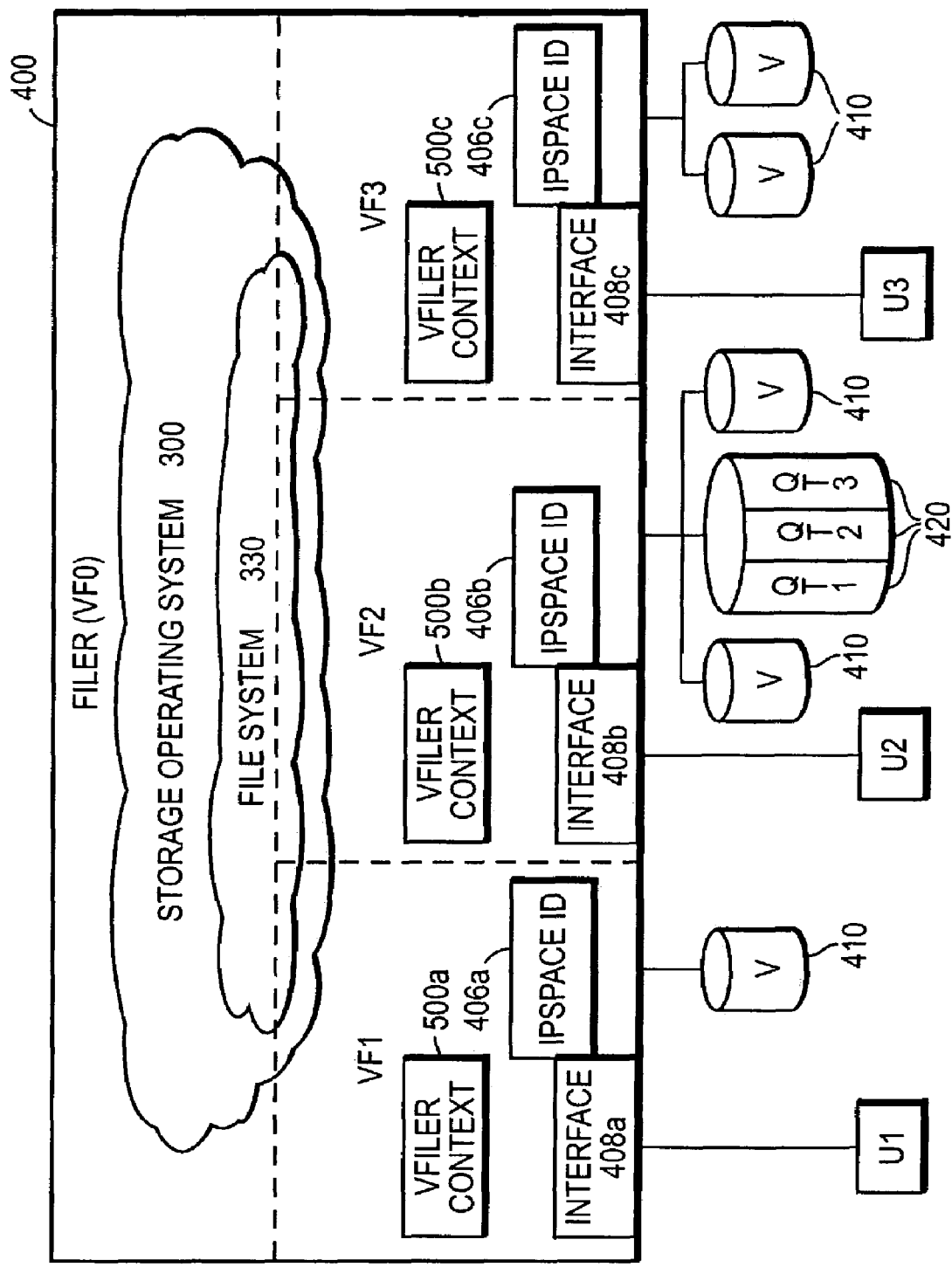
FIG. 4 is a schematic diagram of an embodiment of a filer having a plurality of virtual filers (vfilers) in accordance with the present invention.

FIG. 4 is a schematic diagram of an embodiment of a filer platform 400 having a plurality of vfilers in accordance with the present invention. Each vfiler may be embodied as a server, e.g., a CIFS server, which is referenced by a logical name, e.g., VF1-VF3. From the perspective of a client, each vfiler is separate and distinct from the other vfilers. Each vfiler VF1-VF3 is configured with one or more Internet Protocol (IP) addresses that may be assigned to one or more network interfaces 408a-c. In this context, the term network interface refers to an IP addressable interface, including a "physical" NIC and a "soft" NIC, such as a VIF, a VLAN and an emulated LAN (ELAN). Notably, a single NIC can support a plurality of IP addresses and, with such a configuration, multiple vfilers can effectively share a single NIC, if desired.

Each interface of the filer is further assigned an IPspace identifier (ID) 406a-c that essentially "binds" the interface to an IPspace. An IPspace refers to a distinct IP address space in which the filer and its storage operating system participate. A single filer can support multiple IPspaces. Each vfiler is associated with an IP address space and, thus, belongs to one IPspace. The IP addresses within each IPspace must be unique. The IPspace is further described in copending and commonly-assigned U.S. patent application Ser. No. 10/035,666 filed on Dec. 28, 2001 titled, Technique for Enabling Multiple Virtual Filers on a Single Filer to Participate in Multiple Address Spaces with Overlapping Network Addresses, which is hereby incorporated by reference as though fully set forth herein.

The units of storage resources allocated to each vfiler include a volume or sub-volume (qtree). A volume (V) 410 is a unit of storage comprising a file system or hierarchy of directories and files. A qtree, QT1-3 420, is a special directory similar to a mini-volume (mini-file system) or subdivision of a volume that has the property of being able to identify itself within a file system by, e.g., a qtree identifier (qtreeid) stored within an inode of a file. The vfiler architecture provides efficient utilization and management of these storage resources, including creation, assignment and mapping of the resources to and among the vfilers. For example, a virtual server (such as vfiler) and its associated storage resources (such as qtrees) may be migrated to a server (such as a filer) and consolidated with other virtual servers (vfilers) having similarly named resources. Since the storage resources are allocated on a per-vfiler basis, such server consolidation and storage migration are transparent to a client because there is no change in the way the client refers to its data.

Encapsulation

Each instance of a vfiler is described by "external" and "internal" configuration. External configuration describes the resources assigned to a vfiler (e.g., one or more IP addresses and one or more units of storage, such as an entire volume or a qtree on a volume) and capabilities available to a vfiler (e.g., protocols allowed to run on the vfiler). Internal configuration (i.e., internal to the vfiler) controls operation of various protocol modules or "vfiler options" associated with the vfiler. Examples of such options include whether a network information system (NIS) server is to be used with the vfiler and whether a particular protocol, such as NFS, uses TCP or UDP as its underlying transport.

On-disk Representation

The external configuration information described above is preferably stored "on-disk" in a global registry of the physical filer (which is typically stored on the root volume of the filer), whereas the internal configuration is stored in a private registry in the storage assigned to the vfiler. Given the split configuration of a vfiler, all information needed to create a vfiler on a new "head" is typically not available when migrating storage devices, such as disks, belonging to a vfiler from one physical filer to another. Note that a "head" is defined as all parts of a filer excluding disk shelves. The internal configuration is available, but the external information is only available on the old filer.

In an embodiment of the present invention, the external configuration information can be redundantly stored on the migrated disks of the vfiler. However, this information must be stored in such as fashion that it is not accessible (modifiable) to an administrator of the vfiler. The external configuration is preferably stored in a meta-data portion of all file system units (e.g., volumes) of the migrated disks. When the migrated disks of a disk shelf are attached to the filer platform, the disk software layers of the storage operating system search for the external configuration information in the attached storage units and instantiates those vfilers that are "discovered". This allows moving of a vfiler simply by removing the disk shelf containing its storage disks from one physical filer head and attaching them into another physical filer head or by storing the external configuration information in encrypted form on data that may be replicated or migrated.

According to an aspect of the invention, a vfiler is created by the following command line interface (CLI) command of a user interface associated with the operating system:

vfiler create [xyz][-s IPspace-name][-i IP address(s)] [/vol/vol2][/vol/vol3/qt1]

wherein xyz is the name of the created vfiler, -s IPspace-name is the name of the IPspace to which the vfiler belongs and -i IP address(s) denotes a particular IP address or series of IP addresses of the vfiler. In addition, the notation /vol/vol2 is a first path descriptor to a first unit of storage, whereas the notation /vol/vol3/qt1 is a second path descriptor to a second unit of storage. The default vfiler is vfiler 0 (VF0) that is created at initialization upon booting of the physical filer; VF0 is the only vfiler embodied in the filer if no other vfilers are created. The default VF0 is associated with the physical filer platform to enable access to, e.g., filer resources that are unassigned after all resource assignments have been made for all vfilers on the filer. When no vfilers are defined, VF0 includes all resources of the filer.

In Core Representation

In particular, the vfiler create CLI command creates a vfiler context 500a-c for each vfiler. Note that a vfiler context is created for VF0 at initialization of the filer. FIG. 5 is a schematic block diagram illustrating an in core representation of a vfiler context 500 containing configuration information or "state" needed to establish an instance of a multi-protocol server. Multiple instances of these contexts provide the basis for the vfiler architecture. The vfiler context 500 includes fields for holding a name 502 of the vfiler and a universally unique identifier (UUID 504) that is created with the vfiler context. The UUID may comprise, e.g., the current time of day and a medium access control (MAC) address associated with the vfiler. A vfiler list field 506 contains a list of vfilers on the filer platform and an IPspace indicator (ID) field 508 holds the IPspace ID of the vfiler.

Resource Mapping

According to the vfiler architecture, hardware resources, such as storage and network devices, are not directly assigned to the vfilers. Instead, software objects representing (in full generality) only a portion of the capabilities of these hardware devices are assigned to the vfilers. These software ("soft") objects correspond only to a "dynamically adjustable" portion of a hardware resource. The advantage of using soft objects for assignment to a vfiler is total flexibility in allocating, adding, moving and removing complete or portions of hardware resources between vfilers on a physical filer. These operations can be accomplished very quickly using, e.g., a simple short-running console command as opposed to a complex, long-running procedure of re-configuring or copying hardware objects between hardware partitioning based virtual servers, such as a VM or data mover.

Figure 6:
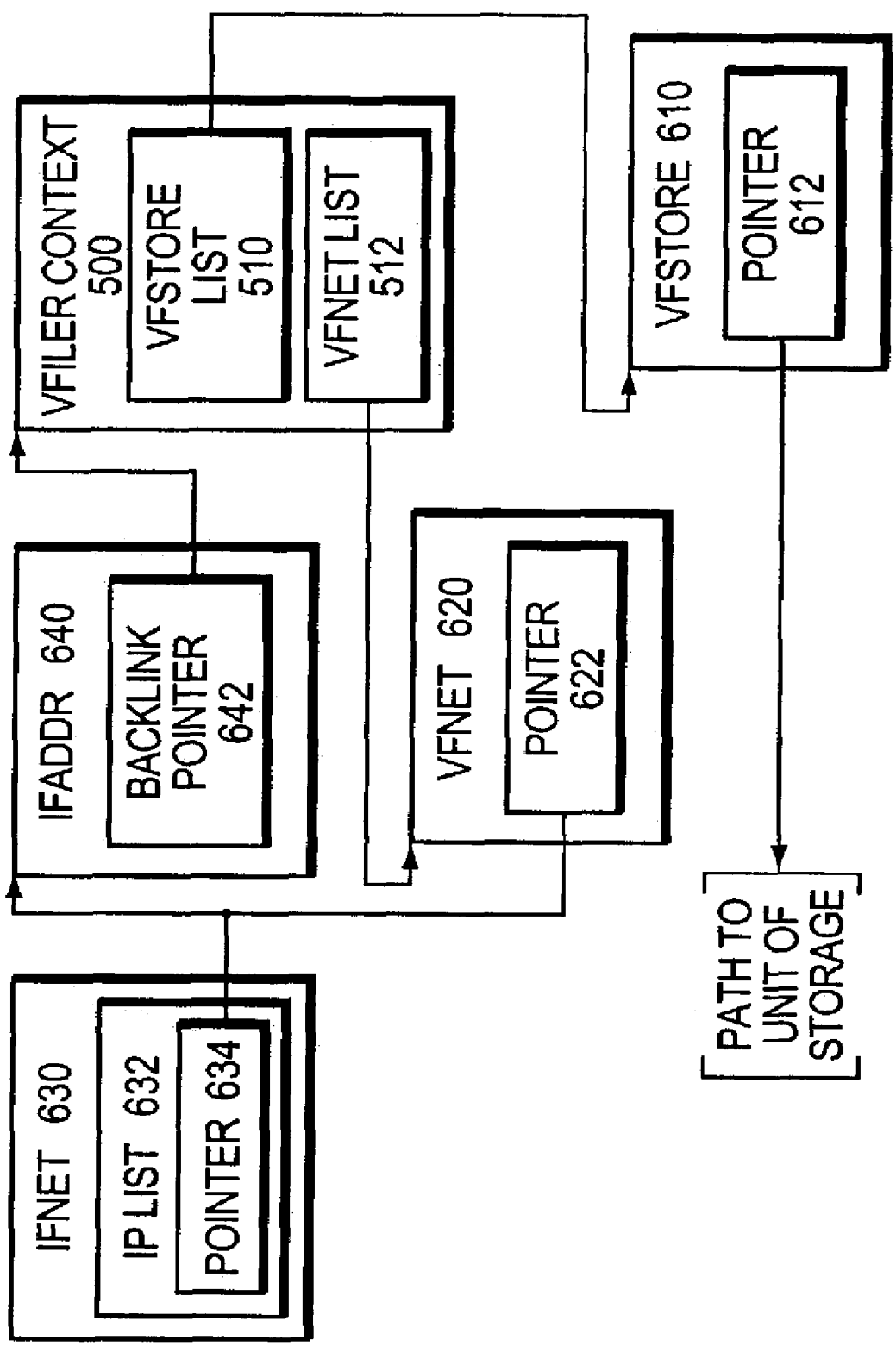
FIG. 6 is a schematic block diagram illustrating soft object data structures that may be advantageously used with the present invention.

Therefore, other fields of the vfiler context structure 500 hold a list 510 of virtual filer storage (vfstore) structures (soft objects) and a list 512 of virtual filer network (vfnet) soft objects. FIG. 6 is a schematic block diagram illustrating soft object data structures that may be advantageously used with the present invention. In particular, the vfstore list 510 comprises pointers to vfstore soft objects 610, each of which has a pointer 612 that references a path to a unit of storage resource, such as a qtree or volume, allocated to the vfiler. This allows, e.g., a volume consisting of multiple qtrees to be effectively shared between vfilers. A hash table (not shown) is also provided that "maps" each qtree or volume back to a vfiler context 500 (and thus a vfstore 610).

The vfnet list 512 comprises pointers to vfnet soft objects 620, each of which has a pointer 622 that references an interface address (ifaddr) data structure 640 representing an IP address assigned to the vfiler. Each vfnet object 620 represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects 620 and, thus, potentially different vfilers. If only a single IP address is associated with an interface (as represented by an interface network (ifnet) data structure 630), only one vfnet object 620, and therefore only one vfiler, uses the capabilities of the NIC.

In accordance with another aspect of the invention, resource mapping is defined as the mapping between soft objects that represent assigned resources of a vfiler (e.g., vfstore and vfnet objects) to portions of hardware resources, such as a qtree/volume and an ifnet structure. The vfstore and vfnet soft objects thus provide a level of indirection that represents the dynamically adjustable portions of capabilities of these hardware resources. That is, these soft objects are "linked" to other software objects (data structures) representative of the hardware resources in a manner that enables flexibility when "logically" reassigning those network and storage resources by, e.g., changing pointers of the objects. Such flexibility allows logical establishment of vfiler configuration changes at the file system level, as opposed to physical establishment by, e.g., manually rearranging the network and storage hardware resources.

For example, an ifnet structure 630 includes an IP list field 632 that contains a list of IP addresses assigned to a network interface. The list 632, in turn, includes pointers 634 that reference appropriate ifaddr data structures 640 associated with those IP addresses. As noted, each vfnet object 620 may contain a pointer 622 to an ifaddr structure 640 (if the corresponding IP address is configured on an ifnet structure 630) or may contain a null value (if the address is not configured). Each ifaddr structure 640 also contains a back link pointer 642 to the vfiler context 500 (and therefore to a corresponding vfnet object 620).

Similarly, each vfstore object 610 has a pointer 612 to a path of a unit of storage, if the storage resource is online. In the illustrative embodiment, the WAFL file system 330 maintains information relating to the availability and scope of units of storage, such as qtrees and volumes. System calls are provided to query the file system with a path and, in response, receive a storage identifier tuple (e.g., fsid, qtreeid) that indicates the volume and qtree to which the path belongs.

Resource mapping in the vfiler architecture further enables efficient network and storage management with respect to, e.g., migration (assignment) of network and storage resources among vfilers. Network management refers to the set of data structures and algorithms that maintain the resource mapping between vfilers and their network resources as dynamic changes are made to the assignment of these resources and other changes on the filer platform. Storage management, on the other hand, refers to the set of data structures and algorithms that maintain the resource mapping between vfilers and their storage resources as dynamic changes are made to the assignment of these resources and other changes on the platform. Assignment changes include the addition, movement and removal of resources between vfilers. Other system changes include the creation of new NICs (VIFs and VLANs, or new devices) or the addition/on-lining/off-lining of storage volumes.

Network and storage management also includes the tasks performed on networking and storage objects when changes are made to the assignments of resources between vfilers. For example, TCP/IP connections and routing associated with an IP address must be reinitialized when the vfiler assignment of an IP address changes. Similarly, disk input/output operations that are in progress on a qtree or volume must be aborted, and quotas must be reinitialized when the vfiler assignment of a storage unit changes.

Security

Another aspect of the present invention is directed to security and the creation of security domains on the filer platform 400. The storage operating system 300 and its WAFL file system 330 implement the notion of multi-protocol security wherein every file has a form of native security, e.g., UNIX-style or NT (NTFS)-style. The native security style of a file is available from security information contained in the inode of the file. In the case of a NFS file, the UNIX-style security information stored in the inode comprises (i) an owner of file, (ii) a user ID and primary group ID ("security objects"), and (iii) permissions/rights for user and group. For NT-style security file, a pointer in the inode references a security descriptor that comprises similar owner, security object and permissions/rights information.

A feature of the novel vfiler architecture is that each vfiler is associated with a unique and distinct security domain from the perspective of a client. In addition, each vfiler shares access to a common file system (e.g., the WAFL file system). Accordingly, interpretations of the security object associated with, e.g., a client accessing the common file system may vary among vfilers because each vfiler is associated with its own security domain. To address this, each vfiler context further includes information pertaining to the security domain of the vfiler to thereby enable controlled access to allocated and shared resources of the vfiler. Specifically, each vfiler context 500 has a pointer to an /etc/passwd,group file 516 containing a user ID and group ID associated with each user password. Additionally, each vfiler context includes its own set of local Windows users and groups, together with network connections and other mechanisms necessary for authentication in a Windows environment, as described herein.

Because of the multi-protocol nature of the storage operating system, a situation may arise where an NT user (Windows client) may attempt to access a file having UNIX-style security (or vice versa, where a UNIX user/client may access a file having NT-style security). The vfiler architecture further includes a multi-protocol feature that supports multiple different clients having different types of security, and the ability to map those different client security types to different vfilers of a filer. In particular, the WAFL file system 330 implements a multi-protocol mapping procedure to determine whether a client can access a requested resource/file. This mapping procedure generally involves the use of a security controller associated with the security style of the resource to perform lookup operations into a security database to resolve the identity of the client/user. The novel vfiler context structure 500 implements this feature by providing a pointer that references a multi-protocol mapping library file 518 that enables translation of permission checking attributes from one protocol to another (e.g., NFS to NT security).

Broadly stated, assume a client forwards an NFS request to the filer 400 to access a file having NT-style security. The request includes a set of credentials that has an associated UNIX-style user ID. Therefore, the file system 330 must translate the UNIX user ID to an NT user ID in order to determine the "NT" identity of the user. The file system 330 looks up the user ID in the /etc/passwd file 516 to identify a UNIX user name for the user ID and then translates the user name to an NT user name using the mapping library file 518. The file system then accesses a controller, e.g., an NT domain controller, to provide an NT-style security identifier (as manifested by a credential) for the NT user name. The domain controller returns the credential to the file system, which compares access rights specified therein with an access control list (ACL) associated with the inode of the requested file. An example of a multi-protocol mapping procedure that may be advantageously used with the present invention is described in U.S. patent application Ser. No. 09/035,234 titled, File Access Control in a Multi-Protocol File Server, by Hitz et al., filed Mar. 3, 1998, which application is hereby incorporated by reference.

Each vfiler context 500 further includes a plurality of "module" data structures that includes all information (such as global variables) needed for an instance of a particular protocol or subsystem. For example, a CIFS module data structure 520 contains all information needed for an instance of the CIFS protocol, including information about contacting a domain controller 522, active sessions 524 for the protocol and various control blocks 525 associated with the CIFS protocol. The domain controller is a network server that accepts logon requests and initiates their authentication. Information pertaining to a security domain 526 is also provided to enable NT-type security for a CIFS request. The security information includes a security identifier comprising a domain portion and a relative ID (RID) portion, the latter RID being similar to the user ID of UNIX security. In the case of Windows domain security, the security information also includes a trust relationship with the domain controller. The trust relationship signifies the ability of a vfiler to "trust" the domain controller to authenticate a user on behalf of the vfiler. Each CIFS module 520 also contains a process ID (PID 528) of the CIFS authentication process that enables the CIFS layer to send an authentication request to the correct CIFS authentication process.

There is a similar "per-module" data structure for each of the protocols and subsystems associated with a vfiler including, but not limited to, the NFS protocol 530, Remote SHell (RSH) protocol 540, Telnet protocol 550, NIS subsystem 560, domain name service (DNS) subsystem 570 and registry 580. The NIS subsystem or "yellow pages" is a service locator for the NFS protocol that is implemented as a distributed database storing security information, such user and group IDs associated with each user password. The NIS subsystem module 560 includes information for contacting a NIS controller when access to the distributed security database is required (using, e.g., the /etc/passwd,group information stored in file 516). The DNS subsystem facilitates resolution of a DNS name to a corresponding IP address. The registry is a repository for configuration information pertaining to the hardware, software and users of the filer (and each vfiler).

Boundary Check

Yet another aspect of the present invention relates to a vfiler boundary check performed by the file system (i.e., WAFL layer 330) of the storage operating system 300 to verify that a requesting vfiler is allowed to access certain storage resources on the filer platform. The vfiler boundary check is based on information, such as the unit of storage (qtree or volume) associated with the file, acquired from an inode of a requested file. For every request to access a unit of storage, a boundary check is performed using this information to determine whether the requesting vfiler is authorized to access the storage resource. If the check reveals that the vfiler is not authorized to access the requested storage resource, the request is immediately denied. Otherwise, the request is allowed and the WAFL file system generates operations to process the request.

Assume a plurality of NFS clients U1-U3 access a common NFS server. Each NFS client can "see" the set of resources exported by the NFS server. Accordingly, each client can access substantially all resources of the server. In contrast, if the NFS server is configured as filer 400 (FIG. 4), that server is essentially "divided into" (embodied as) virtual servers VF0-VF3. Each vfiler has its own vfiler context and security domain. Assume further that client U1 is allowed to access vfiler VF1's resources, client U2 is allowed to access VF2's resources and client U3 is allowed to access VF3's resources. U1 will fail the novel boundary checks performed by the file system if it attempts to access VF2's resources. The "logical" boundary checks enforce security (access to shares) within the vfiler domain for all clients, including "hackers" attempting to "spoof" NFS handles. The tools used by the hackers can be used to effectively access any inode on a server, even if that storage is not exported to clients. Therefore, another security aspect of the vfiler architecture involves the use of boundary checks (and their associated data structures) for determining access to storage resources on the physical filer.

Figure 7:
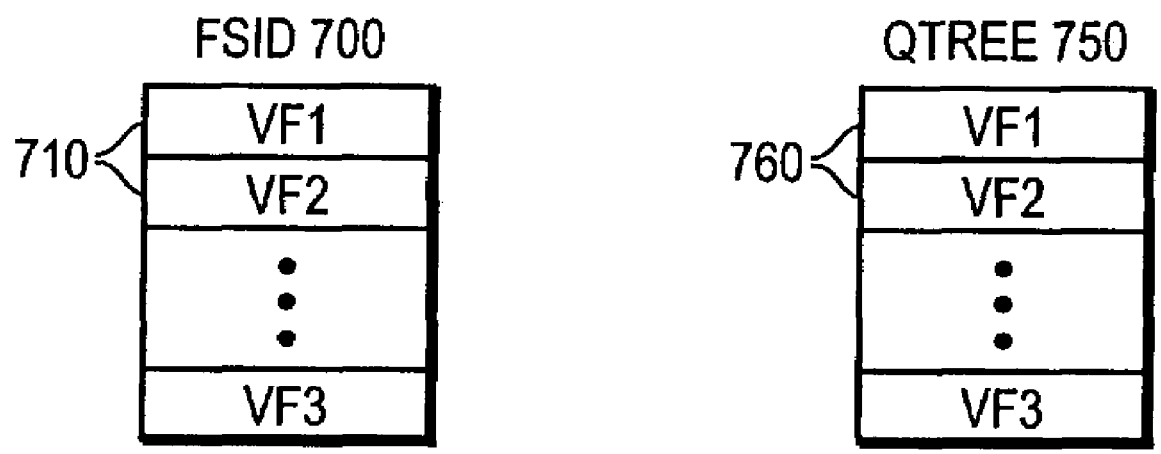
FIG. 7 is a schematic block diagram illustrating various data structures used to implement a vfiler boundary check according to the present invention.

FIG. 7 is a schematic block diagram illustrating the various data structures used to implement the vfiler boundary check. A first data structure, e.g., fsid hash table 700, has a plurality of entries 710, each associated with a vfiler and accessed by a volume (file system) identifier (fsid) functioning as a key into the table. The fsid is assigned to a volume when the volume is created. Each vfiler entry of the fsid table denotes a vfiler, e.g., VF1, VF2 or VF3, which explicitly (completely) owns the volume identified by the fsid. Using an fsid retrieved from an appropriate inode, a determination can be made whether a particular vfiler completely owns a volume associated with the fsid. A second qtree hash table 750 has a plurality of entries 760, each associated with a vfiler and accessed by a key consisting of an fsid and a qtreeid, the latter of which is also retrieved from the inode. Each vfiler entry of the qtree table denotes a vfiler that owns the qtree identified by the qtreeid. Using the fsid and qtreeid, a determination can thus be made as to whether the vfiler completely owns the qtree of a particular volume (file system).

Figure 8:
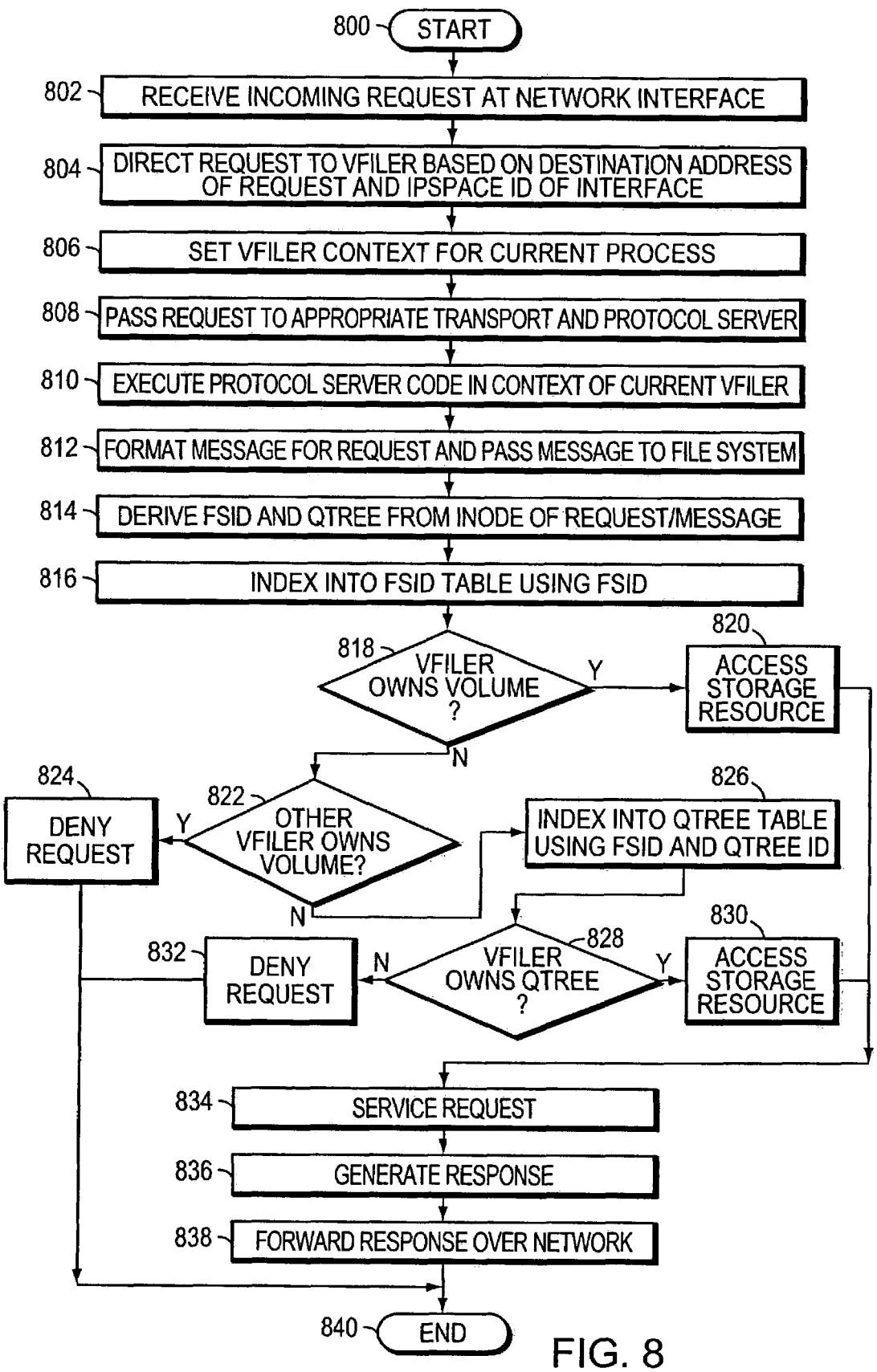
FIG. 8 is a flowchart illustrating the sequence of steps involving a multi-stage verification procedure associated with the boundary check of the present invention.

The vfiler boundary check is preferably associated with a multi-stage verification procedure for accessing storage resources of the filer. FIG. 8 is a flowchart illustrating the sequence of steps involving the multi-stage verification procedure of the present invention. The sequence starts at Step 800 and proceeds to Step 802 where an incoming request (such as NFS, CIFS, HTTP or Telnet packet) is received at a network interface 408 of the filer and, in Step 804, the request is thereafter directed to the proper vfiler based on the destination IP address of the request and the IPspace ID of the interface. For example, assume a driver of the media access layer 310 receives a CIFS request to access a file having a particular file handle. As noted, the network interface is associated with an IPspace. The network driver passes the request to the IP layer 312 where the destination IP address of the request and the IPspace ID 406 are compared with configuration information stored in an IPspace database to select a vfiler context, e.g., virtual filer 2 (VF2), that owns the request. As a result, a vfiler context 500b for VF2 is associated with the request. Selection of a vfiler context for processing an incoming request is described more fully in the copending patent application Ser. No. 10/035,666, Technique for Enabling Multiple Virtual Filers on a Single Filer to Participate in Multiple Address Spaces with Overlapping Network Addresses.

Once the incoming request is associated with a vfiler context, the IP layer 312 issues a system call to set the vfiler context 500 for the current process executing on the filer (Step 806). Internal to the storage operating system is the notion of a process or thread of control executing on the filer. A process block data structure represents the context of that executing process thread. The process block structure includes the notion of a thread running in a vfiler context. To that end, the process block data structure includes a pointer referencing a current vfiler context executing on the filer. If no vfilers are created/defined on the filer, the processes run in the context of the default vfiler VF0.

In Step 808, the IP layer code 312 passes the request to the appropriate transport protocol layer (e.g., TCP), which determines that the request is destined for a particular port, e.g., the CIFS layer. That is, the TCP layer code 314 examines its protocol control block (PCB) tables to determine if there is a "socket" open for a port number included in the request. The port number is used to identify a particular protocol server of the file system protocol layer, e.g., the CIFS layer protocol. The PCB tables are qualified by vfiler and IPspace ID to thereby enable the TCP layer 314 to determine whether the current vfiler context has an open socket. If so, that TCP layer calls into a NetBIOS over TCP (NBT) layer (shown at 315 of FIG. 3) that performs framing for the CIFS protocol. Once the NBT layer 315 has a full request, it calls into the CIFS protocol layer 318.

In Step 810 the protocol server (CIFS code) executes in the context of the current vfiler context and, in particular, its CIFS module. When a variable is referenced, the appropriate variable is retrieved from the CIFS module 520 of the current vfiler context 500. For example, when executing code in the CIFS layer that specifies, e.g., contacting a domain controller, the code refers to the per-module instance of the CIFS protocol within the current vfiler context to acquire the domain controller contact information 522. As noted, all state associated with a vfiler is stored in these per-module data structures. Also, when the vfiler initializes, a set of initialization routines are executed to allocate memory locations, set variables to known values and create processes with the appropriate vfiler ID.

The CIFS protocol determines the type of access (read) and the particular file (file handle) associated with the request. In Step 812, the CIFS protocol server formats a message (WAFL message) associated with the request and passes the message to the WAFL file system. The WAFL message is the mechanism used to forward requests to the WAFL layer 330 for processing in accordance with certain functions. A field of the WAFL message contains an identification of the current vfiler context. The WAFL file system uses that vfiler context for functions such as replies to requests. Specifically, the WAFL message includes a vfiler pointer that sets the vfiler context for subsequent processing by the WAFL layer code. All code relevant to the "virtualized" context, e.g., code needed to execute protocols or management functions, are "aware" of the current vfiler context they are operating within and what capabilities they have based on that current context.

If the requested file is not in memory, the WAFL layer uses the file handle to load an inode for the file in core. The file handle is a reference to the inode data structure that is used internally within the file system. The file handle generally consists of a plurality of components including a file ID (inode number). In Step 814, the WAFL layer code derives the fsid and qtreeid from the inode for the requested file and executes the multistage verification procedure associated with the novel boundary check prior to processing (servicing) the request.

Specifically in a first stage of the verification procedure, the fsid is used as an index into the fsid table 700 (Step 816) to determine whether the requesting vfiler (VF2) explicitly "owns" an entire unit of storage, such as the volume identified by the fsid (Step 818). If so, VF2 can access the storage resource in Step 820. If not, then a second stage of the procedure determines whether the volume is completely owned by another vfiler (Step 822). If so, the request is immediately denied in Step 824 and the procedure ends in Step 840. If the volume is not explicitly owned by another vfiler, then a third stage of the procedure uses the fsid and qtreeid as an index into the qtree table 750 (Step 826) to determine if VF2 owns a portion of the volume, such as a qtree identified by the qtreeid (Step 828). If so, VF2 can access the storage resource in Step 830. If not, the request is immediately denied in Step 832 and the procedure ends in Step 840.

Assuming the boundary checks of the verification procedure are satisfied, the WAFL layer 330 services the request in Step 834 and calls back into the CIFS layer 318. As noted, the WAFL message generated by the CIFS layer includes the current vfiler context. The CIFS protocol then generates a response in Step 836 and forwards it down the network protocol layers and over the network to the client issuing the request in Step 838. The sequence then ends in Step 840.

Assume now that the incoming request is an authentication request. Authentication occurs at the CIFS layer 318. Assume the CIFS protocol determines it needs to contact an external server, e.g., a Kerberos server, to authenticate. Accordingly, a CIFS authentication process is created (spawned) in the context of a vfiler (context). The CIFS layer sends a message to a CIFS authentication process for the current vfiler. As noted, each CIFS module 520 contains the PID 528 of the CIFS authentication process; this enables the CIFS layer to send the message to the correct CIFS authentication process. Once the CIFS authentication process contacts the domain controller and receives, e.g., an acknowledgement that the request authenticates, the authentication process generates a response and sends it down the network protocol layers.

In accordance with the inventive architecture, all vfilers may "share" the same process for some operating system function, e.g., a WAFL thread; the WAFL thread sets its vfiler based on an indicator in the WAFL message. In other cases, a separate process is create for each instance of the vfiler, particularly for possible "blocking" operations, such as waiting to contact a domain controller. For these latter cases, it is not desirable to "hold up" other vfilers during the time it takes to contact the domain controller.

In sum, the novel vfiler architecture facilitates both consolidation of virtual servers and their respective data applications on a single filer, as well as encapsulation of all server resources. Server consolidation is achieved through the creation of vfilers, each of which is associated with a security domain. The security domains are completely disjoint, thereby providing separate and independent vfilers within the same filer platform. This aspect of the invention is particularly useful in the case of a storage service provider, wherein the data applications of multiple client organizations are hosted on the filer. Each client organization can access only its own vfiler(s) and is entirely unaware that it is sharing the same physical filer with other client organizations. The novel architecture thus obviates the need to dedicate a filer for each client organization.

Moreover, the vfiler architecture provides ease of administration with respect to migration of storage resources because the vfiler encapsulates all resources associated with a server. That is, storage migration between and among filers is transparent to clients since the storage resources are allocated on a per-vfiler basis. This obviates the need for a client to change the way (e.g., path descriptor) it refers to its data when the vfiler is moved or copied to another physical filer. In addition, the cost of hardware resources and software needed to provide instances of the vfilers is reduced with respect to separate hardware platforms.

As noted, prior systems are configured to run multiple instances of a server. For example, the virtual machine (VM) operating system from IBM Corporation enables execution of multiple instances of servers on one hardware platform. However, each instance of a VM has its own file system, as well as its own network and storage resources. That is, the network and storage resources of the platform are apportioned and pre-assigned to instances of VMs embodied on the platform. In contrast, the vfiler architecture employs one file system shared by all vfilers with the flexibility to "logically" reassign network and storage resources by, e.g., changing data structures described herein. Therefore, changes to the vfiler configuration are logically instituted at the file system level as opposed to physically rearranging network and storage resources, or reformatting file systems.

Another prior art system is an open source Windows server, e.g., Samba, running on a UNIX operating system platform. The Samba architecture may be implemented at the application layer to provide multiple instances of NT servers running on the UNIX platform. In order to "tie" a server instance to a physical network interface and a security domain to thereby ensure, e.g., security and diversity of security domains among server instances, such an implementation would be forced to modify the networking infrastructure of the underlying UNIX operating system. In contrast, the boundary checking mechanism of the novel vfiler architecture is a function of the networking code of the storage operating system used to configure IP addresses for each vfiler instance. The ability to have an independent security domain (per access protocol) is a first-class property of the vfiler architecture.

In addition, the Celerra architecture available from EMC Corporation utilizes the notion of a data mover that corresponds to an instance of a filer. The data mover "front ends" a Symmetrix storage device having storage resources that can be logically apportioned and assigned to various other data movers. Each data mover has its own set of networking hardware. However, each data mover further includes its own processor running its own copy of the operating system. This is equivalent to "racking together" a plurality of independent "physical" server platforms. In contrast, the vfiler architecture can support many "logical" instances of vfilers within a single filer platform, thereby increasing the scalability of the architecture. Moreover, the novel architecture employs one file system that is shared by all virtual filers and has the flexibility to logically reassign storage resources at the file system level. By sharing common physical filer attributes, such as processor, memory, network interface and operating system resources, the vfiler architecture approach is more cost effective than the prior solutions.

Specifically, vfiler architecture facilitates sharing of resources, particularly for stand-by resources needed for, e.g., fault failover situations. Prior systems preclude such resource sharing because the stand-by resources may not share the same address space, e.g., are not attached to the same physical machines. As a result, the resources cannot be dynamically reconfigured on the platform. In contrast, the novel vfiler architecture is capable of maintaining a shared "spare" pool of networking and storage resources (such as NICs and disk drives) that can be dynamically allocated to a filer. In this context, dynamic allocation refers to "on-the-fly" logical assignment of resources, as opposed to physical relocation of devices/hardware among various platforms.

While there has been shown and described an illustrative embodiment of an architecture that provides the ability to create and maintain multiple instances of vfilers within a filer, it is to be understood that various other adaptations and modifications may be made within the spirit and scope of the invention. For example, in an alternate embodiment, the novel vfiler architecture does not preclude the sharing of a security domain by multiple vfilers. That is, each vfiler may have its own volume and qtree resources, but still be able to share information (e.g., within a NIS domain) with other vfilers. Furthermore, although different vfilers are configured with their own units of storage (e.g., volumes), at the discretion of a physical filer administrator, a particular vfiler (e.g., the default vfiler) could be allowed access to any storage on the platform that is associated with any other vfiler.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

The invention claimed is:

1. A method for encapsulating a virtual server on a server, comprising:
   creating an instance of the virtual server executing on the server;
   storing external and internal configuration information describing the virtual server instance on storage media of the server, wherein the storage media comprises one or more disks coupled to the server, the external configuration information describing resources assigned to the virtual server and capabilities available to the virtual server, the internal configuration information controlling operation of one or more protocol modules associated with the virtual server;
   storing the external configuration information in a global registry on a volume of the server; and
   storing the internal configuration information in a private registry on one of a volume or qtree assigned to the virtual server.

2. The method of claim 1 wherein the step of creating comprises logically partitioning the resources of the server to establish the instance of the virtual server.

3. The method of claim 1 wherein the external configuration information describing resources assigned to the virtual server comprises one or more network resources and one or more storage resources.

4. The method of claim 3 wherein the one or more network resources comprise one or more network addresses of a network interface assigned to the virtual server.

5. The method of claim 3 wherein the one or more storage resources comprise one or more volumes or qtrees on a volume.

6. The method of claim 1 wherein the external configuration information describing capabilities available to the virtual server comprises protocols configured to execute on the virtual server.

7. Apparatus configured to encapsulate a virtual filer (vfiler) on a filer, the apparatus comprising:
   a processing element of the filer;
   a memory coupled to the processing element; and
   a vfiler context structure stored in the memory and accessible by the processing element, the vfiler context structure having a plurality of fields adapted to hold external and internal configuration information describing the vfiler, the external configuration information describing resources assigned to the vfiler and capabilities available to the vfiler, the internal configuration information controlling operation of one or more protocol modules associated with the vfiler, said plurality of fields of said vfiler context structure including at least one of the following:
   a field that holds a name of the vfiler;
   a field that holds a universally unique identifier (UUID) associated with the vfiler;
   a field that holds a list of vfilers on the filer;
   a field that holds a network space indicator that binds a network interface to a network address space in which the vfiler participates; or
   a field that holds a first reference to information pertaining to a security domain of the vfiler to thereby enables controlled access to allocated and shared resources of the vfiler, wherein the first reference comprises a pointer to a file containing one or more identifiers associated with a password used to authenticate a user accessing the vfiler.

8. The apparatus of claim 7 wherein the fields of the vfiler context structure further comprises a field that holds a second reference to information pertaining to a multi-protocol mapping procedure used to determine whether a client can access a requested resource of the vfiler.

9. The apparatus of claim 8 wherein the mapping procedure involves use of a security controller associated with a security style of the requested resource to perform lookup operations into a security database to resolve an identity of the client.

10. The apparatus of claim 8 wherein the second reference comprises a pointer that references a file that enables translation of permission checking attributes from one protocol to another.

11. Apparatus configured to encapsulate a virtual filer (vfiler) on a filer, the apparatus comprising:
    a processing element of the filer;
    a memory coupled to the processing element; and
    a vfiler context structure stored in the memory and accessible by the processing element, the vfiler context structure having a plurality of fields adapted to hold external and internal configuration information describing the vfiler, the external configuration information describing resources assigned to the vfiler and capabilities available to the vfiler, the internal configuration information controlling operation of one or more protocol modules associated with the vfiler, said plurality of fields of said vfiler context structure including at least one of the following:
    a field that holds a name of the vfiler;
    a field that holds a universally unique identifier (UUID) associated with the vfiler;
    a field that holds a list of vfilers on the filer;
    a field that holds a network space indicator that binds a network interface to a network address space in which the vfiler participates;
    a field that holds a first reference to information pertaining to a security domain of the vfiler to thereby enables controlled access to allocated and shared resources of the vfiler;
    a field that holds a second reference to information pertaining to a multi-protocol mapping procedure used to determine whether a client can access a requested resource of the vfiler; or
    fields for holding a plurality of module data structures that includes information needed for an instance of one of a protocol and subsystem.

12. The apparatus of claim 11 wherein the information needed for an instance of a protocol includes information about contacting a domain controller, active sessions for the protocol and various control blocks associated with the protocol.

13. The apparatus of claim 12 wherein the domain controller is a network server that accepts logon requests and initiates authentication of the requests.

14. The apparatus of claim 13 wherein the information needed for an instance of a protocol further comprises information pertaining to a security domain, including one of a security identifier and a trust relationship with the domain controller.

15. A method for encapsulating a virtual server on a server, comprising:
creating an instance of the virtual server executing on the server; and
storing external and internal configuration information describing the virtual server instance on storage media of the server, the external configuration information describing resources assigned to the virtual server and capabilities available to the virtual server, the internal configuration information controlling operation of one or more protocol modules associated with the virtual server, wherein the external configuration information is stored in a first registry of the server, and the internal configuration information is stored in a second registry on a volume assigned to the virtual server.

16. The method of claim 15, wherein the step of creating comprises the step of logically partitioning the resources of the server to establish the instance of the virtual server.

17. The method of claim 15, wherein the storage media comprises one or more disks coupled to the server.

18. The method of claim 15, wherein the external configuration information describing resources assigned to the virtual server comprises one or more network resources and one or more storage resources.

19. The method of claim 18, wherein the one or more network resources comprise one or more network addresses of a network interface assigned to the virtual server.

20. The method of claim 18, wherein the one or more storage resources comprise one or more volumes or qtrees on a volume.

21. The method of claim 15, wherein the external configuration information describing capabilities available to the virtual server comprises protocols configured to execute on the virtual server.

22. A system to encapsulate a virtual server on a server, comprising:
the virtual server, configured by a processor as an instance executing on the server, wherein the virtual server is configured with an external and internal configuration information describing the virtual server on storage media of the server, the external configuration information describing resources assigned to the virtual server and capabilities available to the virtual server, the internal configuration information controlling operation of one or more protocol modules associated with the virtual server, wherein the external configuration information is stored in a of first registry the server, and the internal configuration information is stored in a second registry on a volume assigned to the virtual server.

23. The system of claim 22, further comprising a vserver context structure in a memory, the vserver context structure having a plurality of fields configured to hold external and internal configuration information describing the vserver.

24. The system of claim 23, wherein the external configuration information and internal configuration information fields of the vfiler context structure comprise a field that holds a name of the vfiler and a field that holds a universally unique identifier (UUID) associated with the vfiler.

25. The system of claim 24, wherein the UUID comprises a current time of day and a medium access control address associated with the vfiler.

26. The system of claim 24, wherein the fields of the vfiler context structure further comprise a field that holds a list of vfilers on the filer and a field that holds a network space indicator that binds a network interface to a network address space in which the vfiler participates.

27. The system of claim 26, wherein the fields of the vfiler context structure further comprises a field that holds a first reference to information pertaining to a security domain of the vfiler to thereby enable controlled access to allocated and shared resources of the vfiler.

28. The system of claim 27, wherein the first reference comprises a pointer to a file containing one or more identifiers associated with a password used to authenticate a user accessing the vfiler.

29. The system of claim 28 wherein the fields of the vfiler context structure further comprises a field that holds a second reference to information pertaining to a multi-protocol mapping procedure used to determine whether a client can access a requested resource of the vfiler.

30. The system of claim 28, wherein the mapping procedure involves use of a security controller associated with a security style of the requested resource to perform lookup operations into a security database to resolve an identity of the client.

31. The system of claim 28 wherein the second reference comprises a pointer that references a file that enables translation of permission checking attributes from one protocol to another.

32. The system of claim 28 wherein the fields of the vfiler context structure further comprise fields for holding a plurality of module data structures that includes information needed for an instance of one of a protocol and subsystem.

33. The system of claim 32, wherein the information needed for an instance of a protocol includes information about contacting a domain controller, active sessions for the protocol and various control blocks associated with the protocol.

34. The system of claim 33, wherein the domain controller is a network server that accepts logon requests and initiates authentication of the requests.

35. The system of claim 34, wherein the information needed for an instance of a protocol further comprises information pertaining to a security domain, including one of a security identifier and a trust relationship with the domain controller.

* * * * *

UNITED STATES PATENT AND TRADEMARK OFFICE
CERTIFICATE OF CORRECTION

PATENT NO. : 7,269,696 B2  Page 1 of 1
APPLICATION NO. : 10/410064
DATED : September 11, 2007
INVENTOR(S) : Mark Muhlestein et al.

It is certified that error appears in the above-identified patent and that said Letters Patent is hereby corrected as shown below:

In Specification Column 3, Line 15, please change the line as shown:

example of a security ~~dos main~~ domain is the Windows NT™

Signed and Sealed this

Fifteenth Day of July, 2008

JON W. DUDAS
*Director of the United States Patent and Trademark Office*